United States Patent
Furuse et al.

[11] Patent Number: 6,111,491
[45] Date of Patent: Aug. 29, 2000

[54] MAGNETIC SCREW

[75] Inventors: Akira Furuse, deceased, late of Mishima-gun, by Kazumi Furuse, executor; Kazuto Kunihiro; Nobuyuki Kitai, both of Osaka; Junichi Hashimoto, Yao, all of Japan

[73] Assignees: Koyo Machinery Industries Co., Ltd.; Sumitomo Special Metals Co. Ltd., both of Osaka, Japan

[21] Appl. No.: 09/368,351

[22] Filed: Aug. 5, 1999

Related U.S. Application Data

[62] Division of application No. 09/067,008, Apr. 27, 1998.

[30] Foreign Application Priority Data

May 12, 1997 [JP] Japan .................................. 9-137679
Mar. 12, 1998 [JP] Japan ................................. 10-82747

[51] Int. Cl.[7] .................................................. H01F 7/20
[52] U.S. Cl. .................. 335/285; 335/306; 74/424.8 R; 74/459; 74/DIG. 4
[58] Field of Search .................................. 335/296–306, 335/285; 74/89.15, 424.8 R, 459, DIG. 4

[56] References Cited

U.S. PATENT DOCUMENTS 3,777,587  12/1973  Hoshina et al. ................... 74/424.8 R
5,456,134  10/1995  Bouwer et al. ...................... 74/490.09
5,634,390   6/1997  Takeuchi et al. ........................ 92/33
5,687,614  11/1997  Hashimoto et al. ...................... 74/459

FOREIGN PATENT DOCUMENTS 52-28949   7/1977  Japan .
1-176850   7/1989  Japan .
5-52248    3/1993  Japan .
8-17625    1/1996  Japan .

*Primary Examiner*—Michael L. Gellner
*Assistant Examiner*—Raymond Barrera
*Attorney, Agent, or Firm*—Arent Fox Kintner Plotkin & Kahn

[57] ABSTRACT

A magnetic screw having a screw shaft of magnetic material having thread crests formed on the outer peripheral surface thereof, and a magnetic nut fitted on the outer periphery of the screw shaft. The magnetic nut includes annular permanent magnets magnetized with magnetic poles of opposite polarities on opposed sides, and annular yokes disposed such that the annular yokes are magnetically coupled with the magnetic poles of the magnets. The inner peripheral surfaces of the yokes are provided with thread crests corresponding with the thread crests of the screw shaft with a minute gap G defined therebetween such that magnetic circuits are formed between the screw shaft and the magnets through the thread crests of the screw shaft. The magnets are magnetized on their inner and outer radial surfaces with magnetic poles of opposite polarities, and the yokes are fitted in the magnets.

7 Claims, 5 Drawing Sheets

MAGNETIC SCREW

CROSS REFERENCE TO RELATED APPLICATIONS

This application is a divisional application of U.S. Pat. application Ser. No. 09/067,008, filed Apr. 27, 1998. The subject matter of application Ser. No. 09/067,008 is hereby incorporated by reference.

BACKGROUND OF THE INVENTION AND DESCRIPTION OF RELATED ARTS

The present invention relates to a magnetic screw used as a feed device or the like in machine tools and other machines and instruments.

Magnetic screws are used as feed devices or the like in machine tools, machines and instruments installed in clean rooms and other various machines and instruments. A magnetic screw comprises a screw shaft of magnetic material having thread crests formed on its outer peripheral surface, and a magnetic nut fitted on the outer periphery of the screw shaft with a minute gap defined therebetween. And when the screw shaft is turned around its axis forward and backward, the magnetic nut is axially reciprocated along the screw shaft by the action of the magnetic coupling between the screw shaft and the magnetic nut.

A magnetic screw, unlike a ball screw, does not require the screw shaft and the magnetic nut to be in direct contact with each other, so that it can be used without lubrication and even if it is used for a long time there is no error occurring due to thermal expansion: thus, since it can be used with low noise, low vibration and low dust generation and is superior in durability, its applications are being broadened.

Magnetic screws are classified into two types, one in which the magnetic nut is constituted by incorporating a number of permanent magnets, as described in Japanese Patent Kokai Hei 1-176850, and the other in which the magnetic nut is constituted by magnetizing the inner peripheral surface of a magnetic sleeve, as described in Japanese Patent Kokai Hei 8-17625.

That is, the former magnetic screw comprises a screw shaft of magnetic material having thread crests formed on its outer periphery, and a magnetic nut having a housing internally provided with a number of magnets spirally continuously disposed through a holding member in such a manner that the magnets correspond with the thread crests of the screw shaft.

The latter magnetic screw, as shown in FIG. 9, comprises a screw shaft 30 of magnetic material having thread crests 31 formed on its outer periphery, and a magnetic nut 32 having a housing 33 internally provided with a cylindrical yoke 34 and magnet bodies 35, the inner peripheral surfaces of said magnet bodies 35 being spirally magnetized so that they correspond with the thread crests 31 of the screw shaft 30.

Since the former magnetic screw requires a number of permanent magnets to be spirally arranged internally of the housing of the magnetic nut, there are disadvantages that it is structurally very complicated, that the operation of mounting these permanent magnets on the inner periphery of the housing is very troublesome, and that the magnetic screw lacks in mass productivity, leading to a large increase in manufacturing costs. Furthermore, there are other disadvantages that it is difficult to arrange a number of permanent magnets spirally continuously without a gap and that the axial thrust force in the screw shaft cannot be increased.

Since the latter magnetic screw employs the construction in which the inner peripheral surfaces of the magnet bodies 35 are spirally magnetized to correspond with the thread crests 31 of the screw shaft 30, it is simpler in construction, easier to produce, less expensive and has higher mass productivity than in the former. Further, since the inner peripheral surfaces of the magnets bodies 35 are spirally continuously magnetized, there is another advantage that the axial thrust force can be relatively readily obtained as compared with the former case. In the case of this latter magnetic screw, however, since N- and S-poles are alternately spirally arranged on the inner peripheral surfaces of the magnet bodies 35 in such a manner as to correspond with the thread crests 31 of the screw shaft 30, as shown in FIG. 9, N- and S-poles spirally arranged on the magnet bodies 35 lie alternately axially adjacent each other, with the result that the magnetic fluxes emanating from the N-poles immediately enter the S-poles.

As a result, formed between the magnetic nut 32 and the screw shaft 30, as shown in dash dot line in FIG. 9, is a magnetic circuit which extends from the N-pole of the magnet body 35 via two adjacent thread crests 31 of the screw shaft 30 to the S-pole of the magnet body 35: however, the number of magnetic fluxes passing through this magnetic circuit decreases, weakening the magnetic coupling between the magnetic nut 32 and the screw shaft 30.

Therefore, there is a disadvantage that the magnetic coupling between the magnetic nut 32 and the screw shaft 30 is so low that even if the magnetizing force of the individual N- and S-poles of the magnet bodies 35 are increased, the axial thrust force in the screw shaft 30 cannot be increased.

Further, as shown in FIG. 9, since the inner peripheral surfaces of the magnet bodies 35 are magnetized to spirally provide alternating N- and S-poles, there is a disadvantage that when the screw pitch is small, the magnetization itself of the inner peripheral surfaces of the magnet bodies 35 is very difficult or impossible to perform, which means that a magnetic screw having a small pitch cannot be produced.

OBJECTS AND SUMMARY OF THE INVENTION

A first object of the invention is to provide a magnetic screw which has a high efficiency of magnetic coupling between the magnetic nut and the screw shaft to increase the axial thrust force in the screw shaft and which is simple in construction and superior in mass productivity.

A second object of the invention is to provide a magnetic screw which, even if it is of the small pitch small sized type, can be easily produce and which can be adapted to easily increase or decrease the thrust force in the design and production stages.

A third object of the invention is to provide a magnetic screw in which the magnetic flux density of the magnetic nut can be made substantially uniform, preventing a variation in the magnetic flux density to increase the thrust force in the screw shaft.

A fourth object of the invention is to provide a magnetic screw which is capable of preventing magnetic powers such as iron powder from adhering thereto.

A fifth object of the invention is to provide a magnetic screw which is capable of maintaining the magnetic nut and the screw shaft in a non-contact state to ensure a smooth reliable action between the screw shaft and the magnetic nut.

A sixth object of the invention is to provide a magnetic screw which is capable of minimizing the leakage of magnetic flux in attaching the magnetic nut to a required member, thus preventing the thrust force from being decreased.

To achieve these objects, a magnetic screw according to the invention comprises a screw shaft of magnetic material having thread crests formed on the outer peripheral surface thereof, and a magnetic nut fitted on the outer periphery of said screw shaft. The magnetic nut comprises annular magnets magnetized on its opposed sides with magnetic poles of opposite polarities and annular yokes disposed such that they are magnetically coupled with the magnetic poles of said magnets. The inner peripheral surfaces of the yokes are provided with thread crests corresponding with the thread crests of the screw shaft with a minute gap defined therebetween such that magnetic circuits are formed between the screw shaft and the magnets through these thread crests. And when the screw shaft is turned forward or backward, the magnetic nut is axially moved along the screw shaft by the action of the magnetic coupling between the screw shaft and the magnetic nut.

These and other objects and features of the invention will become apparent from the perusal of the following detailed description in conjunction with the accompanying drawings.

The accompanying drawings, however, are solely for the purpose of explaining the embodiments and are not intended to restrict the scope of the invention.

DETAILED DESCRIPTION OF PREFERRED EMBODIMENTS OF INVENTION

Preferred embodiments of the invention will now be described with reference to the drawings.

Figure 1:
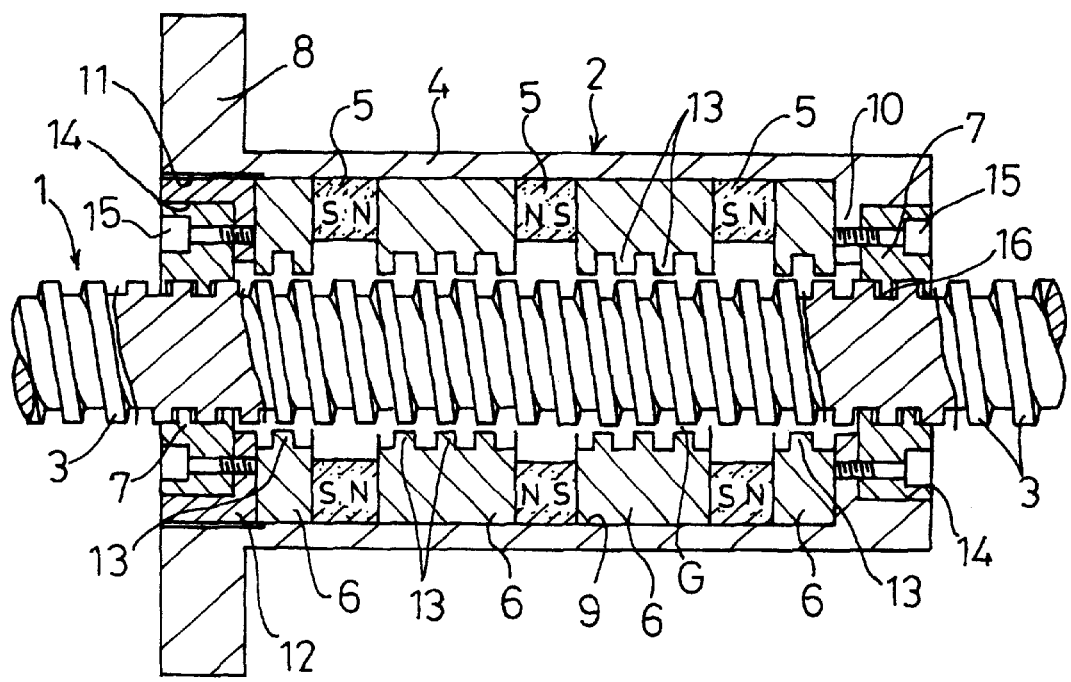
FIG. 1 is a sectional view of a magnetic screw showing a first embodiment of the present invention.
Figure 2:
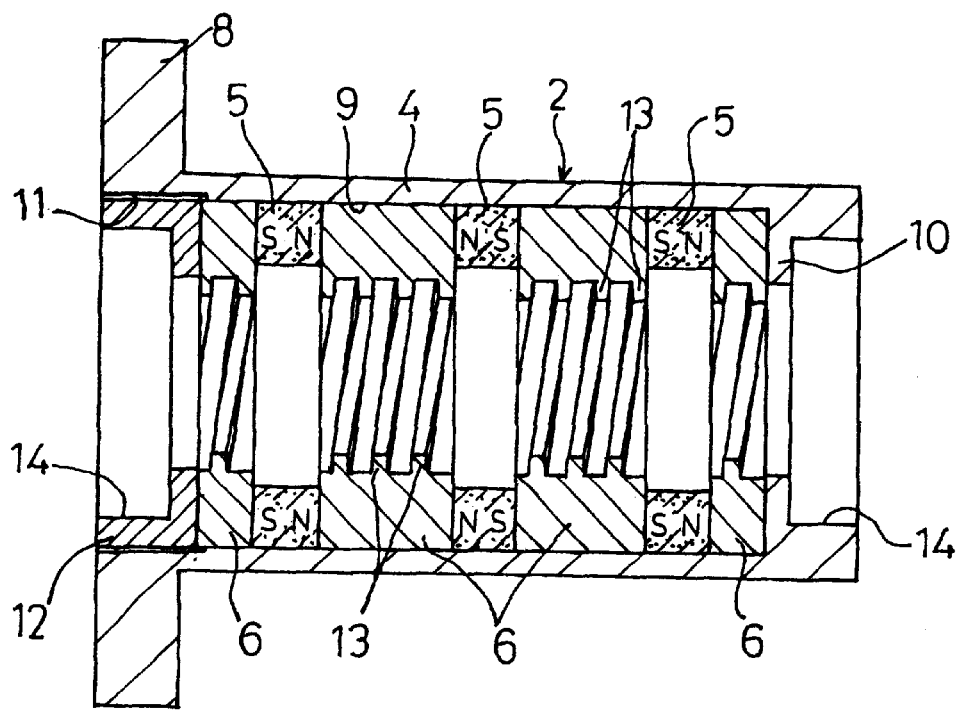
FIG. 2 is a sectional view of a magnetic nut with a screw shaft removed, showing the first embodiment of the present invention.
Figure 3:
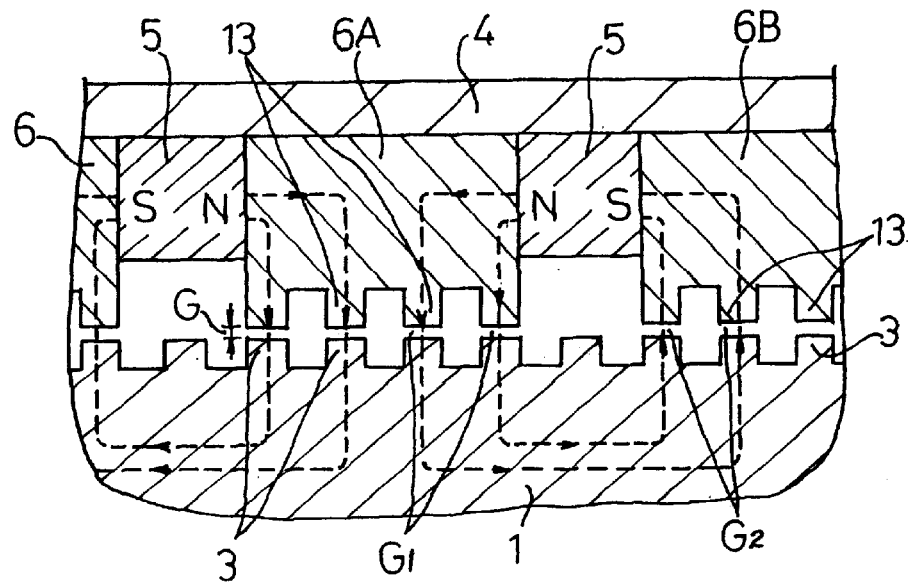
FIG. 3 is an enlarged sectional view of the principal portion showing the first embodiment of the present invention.

FIGS. 1 through 3 shows a magnetic screw according to a first embodiment of the invention.

This magnetic screw, as shown in FIGS. 1 and 2, comprises a screw shaft 1 of magnetic material, and a magnetic nut 2 fitted on the outer periphery of the screw shaft 1. The screw shaft 1 is formed on its outer peripheral surface with thread crests 3 with a fixed pitch and a predetermined lead. In addition, a square thread whose crests 3 have a square cross section is used for the screw shaft 1.

The magnetic nut 2 has a housing 4 of non-magnetic material, such as stainless steel, and annular magnets 5 and annular yokes 6 are alternately fitted in said housing 4, with two guide rings 7 disposed at the axial ends.

In addition, the magnetic nut 2 is fixed to the table of a feed device or the like and is movable axially of the screw shaft 1.

The housing 4 is a long, substantially cylindrical body extending axially of the screw shaft 1. The housing 4 is integrally formed with an attaching flange 8 on the outer periphery thereof at one axial end. The housing 4 is internally formed with a receiving portion 9 extending over a required range in the axial central region for receiving the magnets 5 and yokes 6, said receiving portion 9 having a partition wall 10 formed at one end thereof and an internal thread 11 at the other end.

A plurality of magnets 5, e.g. three magnets, are disposed axially at predetermined intervals. Axially there are a plurality of yokes 6, e.g. four yokes, which are axially arranged alternately with the magnets 5 in such a manner as to sandwich each magnet 5 between two yokes 6.

The three magnets 5 and four yokes 6 form a magnet unit in which they are alternately arranged such that each magnet 5 is sandwiched between two yokes 6. This magnet unit is axially removably fitted in the receiving portion 9 of the housing 4 through the side associated with the internal thread 11 and is fixed in position in the housing 4 by the partition wall 10 cooperating a keep nut 12 which is removably screwed in the internal thread 11.

In addition, in this embodiment, a magnet unit has been composed of three magnets 5 and four yokes 6: however, the numbers given are by way of example only, and in designing and producing the magnetic screw, the respective numbers etc., of magnets 5 and yokes 6 may be suitably determined according to the required magnitude of the thrust force. Further, while it is desirable to arrange them alternately so that each magnet 5 is interposed between two yokes 6, the respective numbers of magnets 5 and yokes 6 may be equal to each other: one each or the same plurality each.

Each magnet 5 is made of a ferromagnetic material, such as Nd—B—Fe type, and its axially opposite end surfaces are substantially parallel. Each magnet 5 is magnetized with magnetic poles of opposite polarities continuously over the entire circumference such that circumferentially continuous N- and S-poles are formed on the opposite end surfaces. And the magnets 5 are arranged such that the magnetic poles of the same polarity of a pair of adjacent magnets 5, i.e., N to N or S to S, are axially opposed to each other. In addition, the magnets 5 are substantially the same in the axial dimension and thickness.

The yokes 6 are made of magnetic material of the iron or the like type and its axially opposite end surfaces are substantially parallel. Each intermediate yoke 6 is arranged such that its opposite end surfaces are contacted with the end surfaces of the magnets 5 disposed on its opposite sides, while the yokes 6 at the opposite ends are arranged such that they are contacted at one of their respective end surfaces with the partition wall 10 and the keep nut 12 and at the other end surfaces with the end surfaces of the magnets 5, so that they are magnetically coupled with the magnetic poles of the magnets 5 in the magnetic fields of their magnetic poles.

In order for the intermediate yokes 6 to be magnetically coupled on their opposite sides with the sides of same polarity of the two magnets 5, they have a greater axial length than that of the magnets 5 and the yokes 6 disposed at the opposite ends; for example, their axial length is about 2–3 times, preferably 2.3–2.5 times as great as that of the yokes 6 at the opposite ends. Further, the yokes 6 at the opposite ends have an axial length which is substantially the same as or somewhat greater than that of the magnets 5 in order to effect magnetic coupling in the magnetic field of the inner one magnet 5.

The inner diameter of each yoke 6 is smaller than the inner diameter of the magnets 5 so that it projects inward beyond the inner peripheral surfaces of the magnets 5, and each yoke 6 has thread crests 13 spirally formed in the inner peripheral surface thereof. The thread crests 13 of each yoke 6, as shown in FIG. 3, are the same in pitch and lead as the thread crests 3 of the screw shaft 1. The inner periphery of each yoke 6 is formed to radially correspond with the thread crests 3 of the screw shaft 1 with a minute gap G defined therebetween, thus forming a magnetic circuit (see the dotted line in FIG. 3) between the screw shaft 1 and the magnets 5 through these thread crests 3 and 13 corresponding with each other.

In addition, the thread crests 13 of each yoke 6 are square in section. Further, the outer peripheral surface of each yoke 6 is substantially the same in diameter as the outer peripheral surface of each magnet 5 but may be somewhat greater or smaller in diameter than the outer peripheral surface of each magnet 5.

Each guide ring 7, which serves to slidably guide the screw shaft 1 while keeping it substantially concentric with the yokes 6, is made of a synthetic resin material which slides well and which is superior in wear resistance. The guide rings 7 are fitted in the recesses 14 formed in the partition wall 10 and keep nut 12 and removably fixed in position by set screws 15.

In addition, suitable synthetic resin materials employed to make the guide rings 7 include nylon, polyacetal, polyimide and fluororesin.

The inner peripheral surfaces of the guide rings 7 are in slide contact with the outer peripheral surfaces of the thread crests 3 of the screw shaft 1. The inner peripheral surface of each guide ring 7 is formed with a step-out preventing projection 16 which slidably engages the thread crests 3 of the screw shaft 1. Therefore, the guide rings 7 slidably guide the screw shaft 1 by their inner peripheral surfaces such that the gap between the thread crests 3 of the screw shaft 1 and the thread crests 13 of the yokes 6 is substantially constant, and the projections 16 prevent the thread crests 3 of the screw shaft 1 and the thread crests 13 of the yokes 6 from stepping out of each other.

Each projection 16 is continuously spirally formed on the inner peripheral surface of the guide ring 7. Usually, there is a minute gap between the projection 16 and two adjacent thread crests 3 on its opposite sides so as to prevent direct contact therebetween; thus, when the magnetic nut 2 is subjected to an excessive load, they contact each other to prevent the step-out. In addition, it may be arranged that the projections 16 and the thread crests 3 are always in slide contact with each other.

In the magnetic screw of the above arrangement, when the screw shaft 1 is turned forward and backward around its axis, the magnetic nut 2 is reciprocated axially of the screw shaft 1 in coordination with the turning of the screw shaft 1. That is, as shown in FIG. 3, in the central magnet 5 and yokes 6A and 6B on its opposite sides, the magnetic flux from the N-pole of the magnet 5 passes successively through the left-hand side yoke 6A magnetically coupled with this N-pole, the thread crests 13 of the right-hand half of the inner peripheral surface, and the air gap G and enters the thread crests 3 of the screw shaft 1 corresponding with the right-hand half of the left-hand side yoke 6A. And the magnetic flux passes successively through the screw shaft 1, the thread crests 3 of the screw shaft 1 corresponding with the left-hand half of the right-hand side yoke 6B, the air gap G, the thread crests 13 of the left-hand half of the right-hand side yoke 6B, and this right-hand side yoke 6B and enters the S-pole of the magnet 5.

Therefore, the thread crests 13 of the right-hand half of the left-hand side yoke 6A are rendered N while the thread crests 3 of the screw shaft 1 opposed to the N-rendered thread crests 13 are rendered S. Further, the thread crests 13 of the left-hand half of the right-hand side yoke 6B are rendered S while the thread crests 3 of the screw shaft 1 opposed to the S-rendered thread crests 13 are rendered N. Therefore, between the yokes 6A, 6B on the opposite sides of the magnet 5 and the screw shaft 1, there is produced an attractive force between the thread crests 3 and 13 owing to magnetic coupling.

This is the same with the left-hand side magnet 5 and the yokes 6 on its opposite sides, and with the right-hand side magnet 5 and the yokes 6 on its opposite sides.

On the other hand, since the thread crests 3 of the screw shaft 1 and the thread crests 13 of the yokes 6 correspond with each other in that they are the same in lead and pitch, the attractive force produced between the thread crests 3 of the screw shaft 1 and the thread crests 13 of the yokes 6 acts solely radially of the screw shaft 1, whereby the screw shaft 1 and the magnetic nut 2 are magnetically coupled with each other. Therefore, when the screw shaft 1 is rotated forward or backward, the magnetic coupling causes the magnetic nut 2 to move axially of the screw shaft 1.

Then, the guide rings 7 having the projections 16 which are engageable with the thread crests 3 of the screw shaft 1 slide on the outer peripheral surface of the screw shaft 1, while said projections 16 prevent the thread crests 3 of the screw shaft 1 and the thread crests 13 of the yokes 6 from stepping out of each other, thus guiding the magnetic nut 2 axially along the screw shaft 1.

The operating of assembling the magnetic screw comprises preparing a screw shaft 1 having predetermined thread crests 3 formed on the outer peripheral surface thereof, loosely fitting a first right-hand side short yoke 6 on the outer periphery of the screw shaft 1, and then similarly loosely fitting a first magnet. And the end surface of this first magnet 5 abuts against the first yoke 6 such that it is concentric with the screw shaft 1, whereby the first yoke 6 and the first magnet 5 are magnetically coupled together.

Subsequently, a second central right-hand side long yoke 6 is loosely fitted on the outer periphery of the screw shaft 1, and the end surface of a second yoke 6 is contacted with the end surface of the first magnet 5 such that the second yoke 6 concentric with the screw shaft 1. And first and second yokes 6 are circumferentially turned relative to the magnet 5 for adjustment such that the thread crests 13 of the first and second yokes 6 correspond with the thread crests 3 of the screw shaft 1.

Similarly, a second central magnet 5, a third central left-hand side yoke 6, a third left-hand side magnet 5, a fourth left-hand side yoke 6 are successively fitted on the outer periphery of the screw shaft 1 and these magnets 5 and yokes 6 are axially magnetically coupled together to form a magnet unit on the outer periphery of the screw shaft 1.

When the assembling of the magnet unit is over, this magnet unit is fitted in the receiving portion 9 of the housing 4, and the end surface of the first right-hand side yoke 6 is contacted with the partition wall 10, whereupon the keep nut 12 is tightened and the magnet unit is fixed in the housing 4 by means of the partition wall 10 and the keep nut 12. Then, the guide rings 7 are mounted in the opposite ends, whereupon the assembling of the magnetic screw is completed.

If this assembling method is employed, when the first yoke 6 and the first magnet 5 are fitted on the outer periphery of the screw shaft 1 with the end surfaces of the yoke 6 and magnet 5 contacted with each other, there is formed a magnetic circuit between the first yoke 6, the first magnet 5 and the screw shaft 1, with the magnetic flux flowing from the thread crests 13 of the yoke 6 into the thread crests 13 of the screw shaft 1. Therefore, the attractive force acts between the thread crests 13 of the yoke 6 and the thread crests 3 of the screw shaft 1, resulting in the thread crests 13 of the yoke 6 corresponding with the thread crests 3 of the screw shaft 1.

In fitting the second and the following yokes 6 successively, the attractive force is likewise produced between the thread crests 13 of the yoke 6 and the thread crests 3 of the screw shaft 1, resulting in the thread crests 13 of the yoke 6 corresponding with the thread crests 3 of the screw shaft 1. Therefore, in spite of the fact that the yoke 6 having threads crests 13 on the inner periphery is axially divided into parts, the successive fitting of the yokes 6 and magnets 5 on the outer periphery of the screw shaft 1 enables the thread crests 13 of the yokes 6 to easily correspond with the thread crests 3 of the screw shaft 1, so that the entire magnetic screw can be easily and efficiently assembled.

The magnetic nut 2 is constructed by annularly forming each magnet 5, annularly forming each yoke 6, forming thread crests 13 on the inner peripheral surface of said yoke 6, and axially installing the magnets 5 and yokes 6 in the inner periphery of the housing 4 with each magnet 5 sandwiched between yokes 6. Because of this construction, the efficiency of magnetic coupling between the screw shaft 1 and the magnetic nut 2 is improved and the axial thrust force in the screw shaft 1 is increased as compared with the conventional magnetic screw.

Further, since the magnetic nut 2 is constructed by axially installing the annular magnets 5 and annular yokes 6 in the housing 4 and forming the inner peripheral surfaces of the yokes 6 with thread crests 13, the axial thrust force in the screw shaft 1 can be increased and furthermore the magnetic nut 2 is simple in construction and easy to produce; thus it can be produced at low costs and is suitable for mass production.

Since the thread crests 13 on the inner periphery of each yoke 6 correspond with the thread crest 3 on the screw shaft 1 with a minute gap G defined therebetween, the air gap between the thread crests 3 and 13 can be easily and highly accurately defined according to the machining precision of the screw shaft 1 and yokes 6, facilitating the dimensional control of the air gap. Particularly, the yokes 6 are formed with thread crests 13 and since there is no need to set the air gap on the side of the magnets 5, severe control of the inner and outer diameter tolerances of the magnets 5 is unnecessary, so that the production of the magnets 5 is very easy.

The thread crests 13 of the yokes 6 correspond with the thread crests 3 of the screw shaft 1 with a minute gap G defined therebetween, and since the size of the air gap can be easily and highly accurately determined, the magnetic flux easily concentrates on the thread crests 3 and 13 corresponding with each other, and the density of the magnetic flux between them can be increased. Therefore, the attractive force between the screw shaft 1 and the yokes 6 is increased, so that the constraining force between the screw shaft 1 and the magnetic nut 2 is increased and hence the axial thrust force can be enhanced.

Further, since the magnetic nut 2 has magnets 5 and yokes 6 alternately arranged in the housing 4 so that each magnet 5 is sandwiched between yokes 6, the axial thrust force can be easily increased or decreased by suitably determining the respective numbers of magnets 5 and yokes 6.

Further, since each yoke 6 is formed with thread crests 13 and the magnetic flux from the magnets 5 is passed relatively between the thread crests 13 of the yokes 6 and the thread crests 3 of the screw shaft 1, even if the pitch of the thread crest 3 of the screw shaft 1 is small, the thread crests 13 of the yokes 6 and the thread crusts 3 of the screw shaft 1 can be made to correspond with each other easily and reliably so as to provide a sufficient axial thrust force. Therefore, the magnets 5 have only to be circumferentially continuously magnetized to form N- and S-poles at the axially opposite ends; thus, even a magnetic screw having a small pitch can be easily produced and furthermore a sufficient thrust force can be obtained.

Of the plurality of yokes 6 in the housing 4, the intermediate yokes 6 are about 2–3 times or preferably 2.3–2.5 times the length of the yokes 6 at the opposite ends, and the each longer yoke 6 is contacted at its opposite sides with the sides of the same polarity of the magnets 5 on its opposite sides; therefore, in the intermediate yoke 6, the magnetic flux from the magnets 5 on its opposite sides is passed reliably through the right and left halves of the thread crests 13 of the inner periphery, so that the density of the magnetic flux passing through the mutually corresponding thread crests 3 and 13 of the yokes 6 and screw shaft 1 can be made substantially uniform axially throughout and variations in magnetic flux density can be prevented.

Since the housing 4 is made of non-magnetic material, most of the magnetic flux from the magnets 5, as compared with the case where a housing of magnetic material is disposed in the outer side of the magnet unit, passes through the screw shaft 1, with a minimum of leakage of the magnetic flux flowing to the housing 4, preventing iron powder or other magnetic powers from adhering to the outer peripheral surface of the housing 4.

Further, since the magnetic nut 2 is provided with guide rings 7 on the opposite sides of the magnet unit, the gap between the thread crests 3 and 13 of the screw shaft 1 and yokes 6 can be set at the predetermined minute gap G and kept substantially concentric, and as the screw shaft 1 is rotated while the screw shaft 1 and the yokes 6 are held out of contact with each other, the magnetic nut 2 can be smoothly and reliably moved axially of the screw shaft 1.

Furthermore, in the case where each guide ring 7 has a projection 16 on its inner periphery and an excessive load temporarily acts on the magnetic nut 2 during the rotation of the screw shaft 1, said projection 16 slidably engages the thread crests 3 of the screw shaft 1; thus, said projections 16 prevent the screw shaft 1 and the yokes 6 from stepping out. Therefore, in spite of the fact that the rotation of the screw shaft 1 causes the magnetic nut 2 to axially move under the action of the magnetic coupling between the screw shaft 1 and the magnetic nut 2, the thread crests 3 of the screw shaft 1 always correspond with the thread crests 13 of the yokes 6, preventing the step-out therebetween from occurring.

Further, each projection 16 is spirally formed on the inner periphery of the guide ring 7 and fits in a screw groove in such a manner as to slidably engage the thread crests 3 of the screw shaft 1: therefore, the guide ring 7 with the projection 16 prevents dust and other foreign matter from entering the magnetic nut 2.

Figure 4:
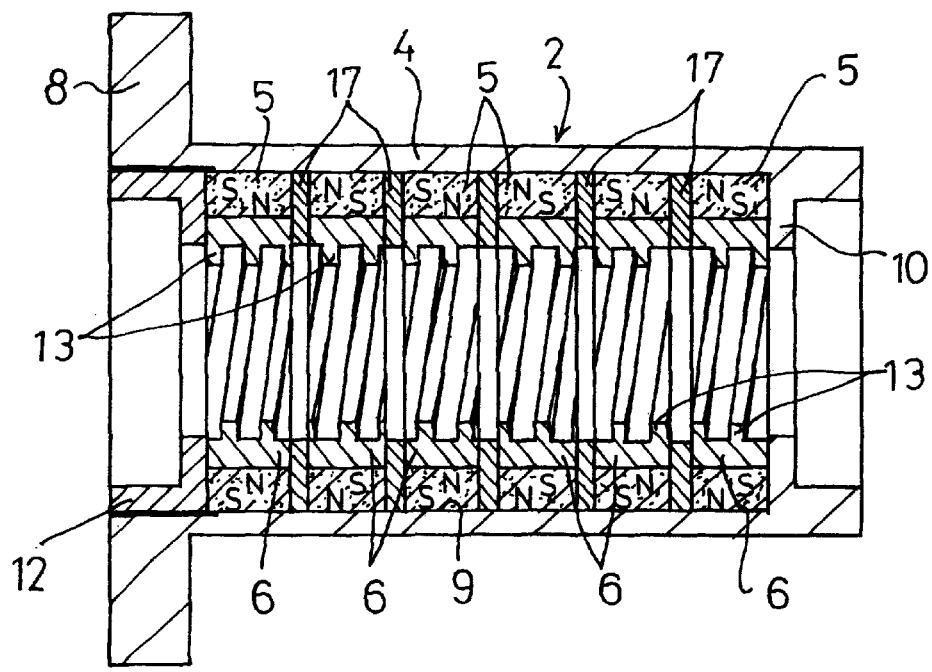
FIG. 4 is a sectional view of a magnetic nut with a screw shaft removed, showing a second embodiment of the present invention.

FIG. 4 shows a second embodiment of the invention. This magnetic screw comprises pluralities of annular magnets 5 and annular yokes 6 which are concentrically fitted together and axially arranged, with spacers 17 interposed between therebetween. And these magnets 5, yokes 6 and spacers 17 constitute a magnetic unit, which is removably installed in the receiving portion 9 of the housing 4 of magnetic material. In addition, in this embodiment, six magnets 5, six yokes 6 and five spacers 17 are used, but these numbers may be suitably changed according to the magnitude of the required thrust force.

Each magnet 5 is magnetized throughout the circumference such that the radially opposed sides, i.e., the inner and outer peripheral surfaces are formed with magnetic poles of opposite polarities. And these magnets 5 are arranged such that the N- and S-poles axially alternate with each other for both the inner and outer sides.

The housing 4 is made of magnetic material and constitutes an outer yoke so that the magnets 5 are in alternate opposite polarity pole connection on the outer side.

Each yoke 6 is of substantially the same in axial length as each magnet 5 and is spirally formed on its inner periphery with thread crest 13 which correspond with the thread crests 3 of the screw shaft 1. Each space 17 serves to maintain an axial spacing between a magnet 5 and a yoke 6 and is made of non-magnetic material in an axially flat annular form.

Magnets 5 and yokes 6 are each in the form of a cylindrical ring greater in axial length than in thickness. The magnets 5 and spacers 17 are of substantially the same diameter in their outer peripheries. The inner peripheral surfaces of the spacers 17 are substantially the same in diameter as the groove bottoms between the thread crests 13 of the yokes 6.

In addition, though the screw shaft 1 and other parts are omitted in FIG. 4, the rest of the construction of this second embodiment is substantially the same as in the first embodiment shown in FIG. 1.

In this second embodiment also, basically, substantially the same functions and effects as in the first embodiment are achieved and this arrangement provides the following advantages.

Each magnet 5 has radially spaced magnetic poles and is internally provided with a yoke 6 which is internally formed with thread crests 13. And the magnetic poles of each magnet 5 are disposed in the direction in which the thread crests 13 of the yoke 6 and the thread crests 3 of the screw shaft 1 are opposed to each other, that is, the magnetic poles are radially opposed to each other. This makes it easier for the magnetic flux from each magnet 5 to pass from the thread crest 13 of the yoke 6 to the thread crest 3 of the screw shaft 1, so that as compared with the first embodiment, the density of the magnetic flux passing through the thread crests 3 of the screw shaft 1 and the thread crests 13 of the yoke 6 is increased.

Therefore, the axial thrust force is enhanced and particularly the use of a number of small-sized high performance permanent magnets of the Nd—B—Fe type make it possible to produce a small-sized magnetic screw having a high thrust force.

Further, each magnet 5 is magnetized to have radially spaced magnetic poles: however, since the spacers 17 are interposed each between a magnet 5 and a yoke 6 adjoining thereto so that secure the predetermined spacing is secured by said spacers 17, there is no possibility of the magnetic flux from one magnet 5 being influenced by the other magnets 5. Further, as compared with the case of the absence of the spacing equivalent to the size of the spacer 17 between adjacent magnets 5, the magnetic flux density between the thread crests 3 and 13 of the yokes 6 and the screw shaft 1 is increased and so is the thrust force.

The assembling of this magnetic screw is performed in the same way as in the first embodiment; however, the interposition of spacers 17 of aluminum or the like each between a magnet 5 and a yoke 6 adjoining thereto improves the operability, making easy and stabilized assembling possible.

In addition, if thicker magnets are used as the magnets 5, a thick yoke to be constituted by the housing 4 has to be used. Therefore, to minimize magnetic screws, it is desirable to use a number of thin-walled small-sized magnets 5.

Further, in the case of making the housing 4 of magnetic material, since this housing 4 also serves an outer yoke, the entire construction of the magnetic screw can be simplified; however, it is also possible to provide the housing 4 with a yoke sleeve of magnetic material independent thereof and disposed therein and make the housing 4 of non-magnetic material.

In addition, the magnets 5 and the inner yokes 6 may be adhesively or otherwise fixed together, with a cylindrical spacer 17 interposed between adjacent magnets 5. So long as the predetermined spacing can obtained between the magnets 5, the spacers 17 may be omitted, leaving the corresponding portions as air gaps.

Figure 5:
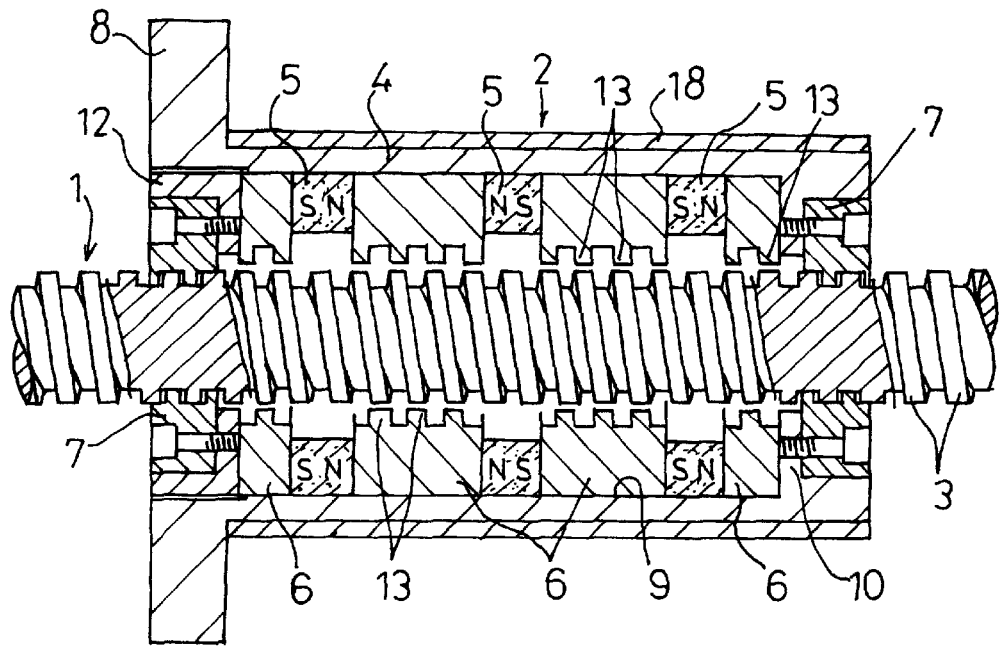
FIG. 5 is a sectional view of a magnetic screw, showing a third embodiment of the present invention.

FIG. 5 shows a third embodiment of the invention. In this magnetic screw, the housing 4 of the magnetic nut 2 is made of non-magnetic material, such as stainless steel, and a sleeve 18 of magnetic material for use as a magnetic shield is closely fitted on the outer periphery of the housing 4.

This magnetic nut 2 has a housing 4 made of non-magnetic material. Therefore, as compared with the case of using a magnetic material for the housing 4, leakage of magnetic flux from the magnets 5 to the housing 4 is reduced, making it easier for the magnetic flux from the magnet 5 to move from the yokes 6 to concentrate in the screw shaft 1, so that the thrust force can be prevented from decreasing.

Further, the provision of the sleeve 18 for use as a magnetic shield on the outer side of the housing 4 results in a decrease in the leakage flux which passes from the sleeve 18 to the outside, thus preventing magnetic powders, such as iron powder, from adhering to the outer peripheral surface of the sleeve 18. Therefore, the possibility is eliminated that magnetic powders, such as iron powder, adhere to the housing 4 or the like and magnetize other parts which lie around the housing 4.

For example, in the case where SUS304 or the like is used for the housing 4 and S25C or the like magnetic material for the sleeve 18, setting the wall thickness of the sleeve 18 at 1 mm or thereabouts makes it possible to obtain a sufficient magnetic shield effect and minimize the decrease in thrust force which can be caused by the provision of the sleeve 18.

Figure 6:
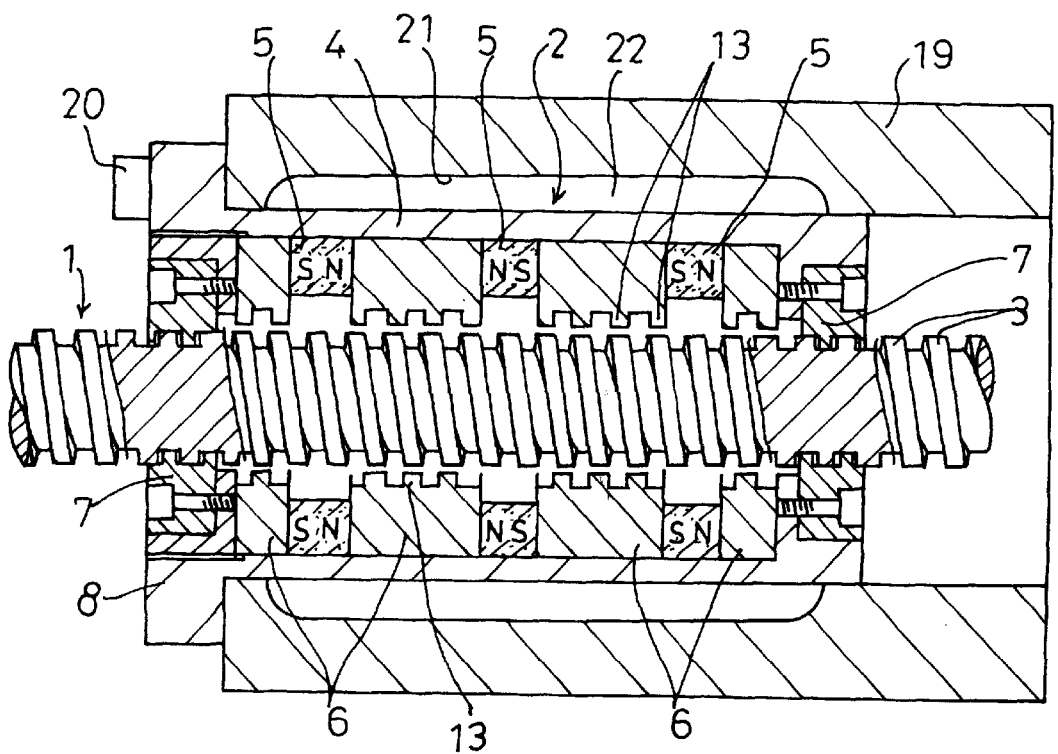
FIG. 6 is a sectional view of a magnetic screw, showing a fourth embodiment of the present invention.

FIG. 6 shows a forth embodiment of the invention. This magnetic screw has a housing 4 of magnetic or non-magnetic material which is fitted in an attaching sleeve 19 and fixed therein by set screws 20, said attaching sleeve 19 being mounted on a required member associated with the movable side. That is, the housing 4 is fitted in an attaching sleeve 19 and removably fixed at its flange 8 to the attaching sleeve 19 by a plurality of set screws 20.

The attaching sleeve 19, which serves to attach the magnetic nut 2 to the table of a feeding device or to other required member associated with the movable side, is fitted on the outer periphery of the housing 4. The attaching sleeve 19 is formed in its entire inner peripheral surface with a recess 21 so as to correspond with substantially the whole of the outer periphery of the housing 4 and the attaching sleeve 19 is contacted with the outer periphery of the housing 4 at the axial ends of the housing 4. And between the attaching sleeve 19 and the housing 4 there is an air gap 22 defined by the recess 21 to surround substantially the whole of the housing 4 from the outer peripheral side.

In the case where the attaching sleeve 19 is made of magnetic material, if the attaching sleeve 19 is disposed close to the outer periphery of the housing 4, the magnetic flux from the magnets 5 leaks to the attaching sleeve 19, thereby decreasing the thrust force. Therefore, such situation can be coped with by internally forming the attaching sleeve 19 with a recess 21 by which to define a predetermined air gap 22 between the housing 4 and the attaching sleeve 19, thereby making it possible to decrease the leakage to the attaching sleeve 19 of the magnetic flux from each magnet 5 and prevent the decrease of the thrust force. This is effective particularly when the housing 4 is made of non-magnetic material.

In addition, the housing 4 for the magnetic nut 2 may be externally formed with a recess 21 to define an air gap 22.

Figure 7:
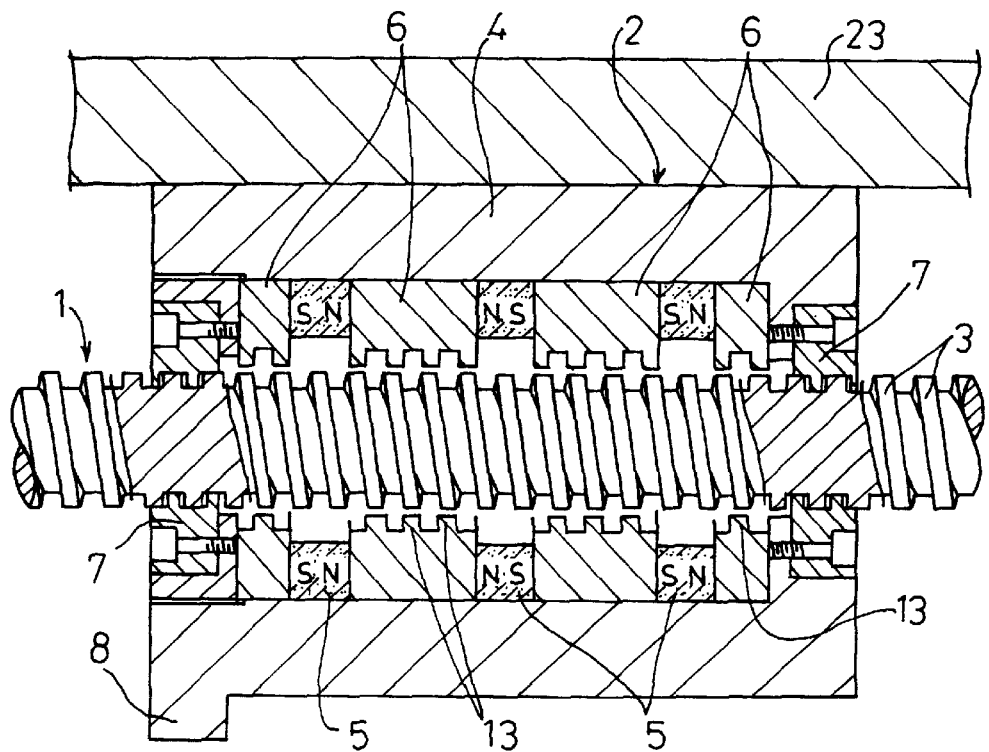
FIG. 7 is a sectional view of a magnetic screw, showing a fifth embodiment of the present invention.

FIG. 7 shows a fifth embodiment of the invention. This magnetic screw has a housing 4 which is made of thick-walled non-magnetic material and directly fixed to a predetermined member 23 of magnetic material associated with the movable side. The required member 23 is the table or the like of a feeding device and is disposed for movement along the screw shaft 1.

In the case where the housing 4 is made of non-magnetic material and its wall thickness is increased, even if the required member 23 of magnetic material is disposed in the vicinity of the housing 4, the leakage flux thereto can be deceased and prevented from influencing the thrust force. Therefore, if the housing 4 is made of thick-walled magnetic material, it can be fixed directly to a required member 23 such as a table of magnetic material.

Figure 8:
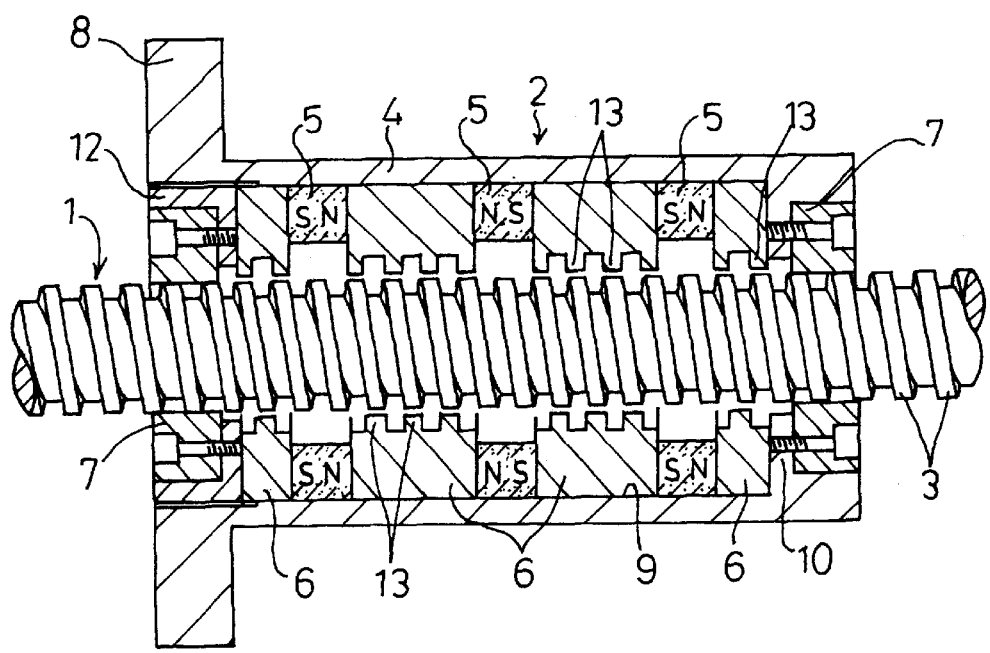
FIG. 8 is a sectional view of a magnetic screw, showing a sixth embodiment of the present invention.
Figure 9:
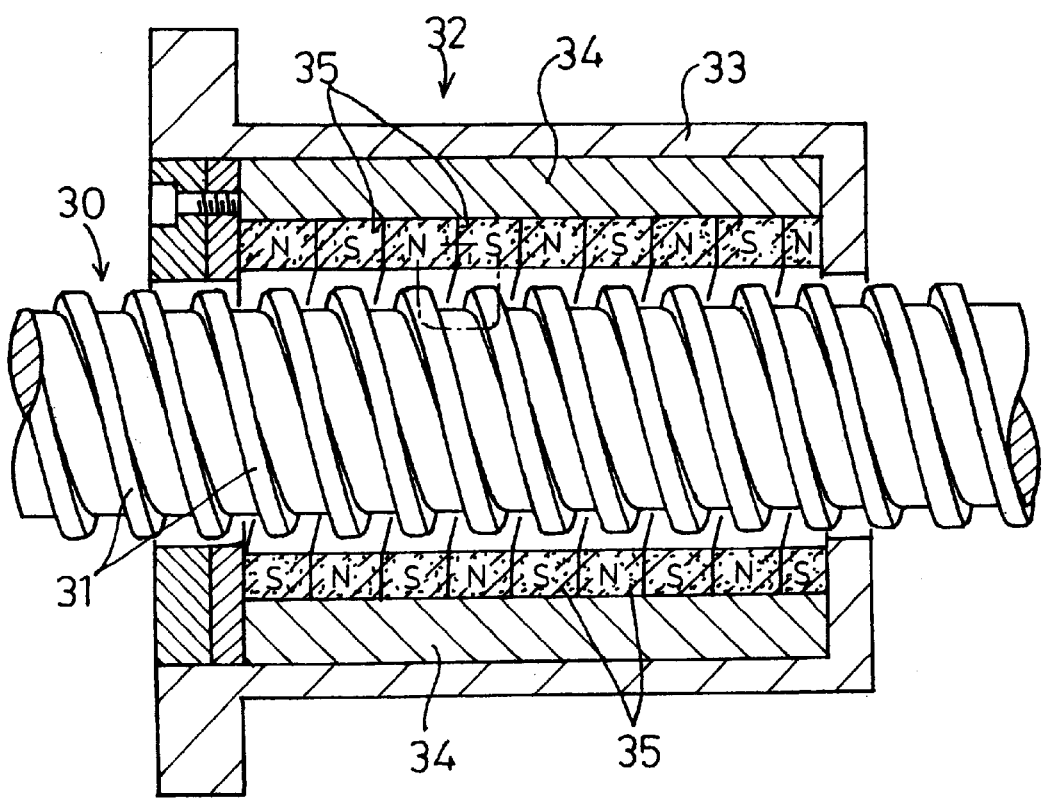
FIG. 9 is a sectional view of a conventional magnetic screw.

FIG. 8 shows a sixth embodiment of the invention. This magnetic screw has no projection 16 on the inner peripheral side of each guide ring 7. And the inner peripheral surface of each guide ring 7 is formed as a cylindrical surface adapted to slidably contact the outer peripheral surfaces of the thread crests 3 of the screw shaft 1.

In this manner, it is possible to omit the projection 16 on the inner peripheral surface of each guide ring 7 and form the inner peripheral surface of each guide ring 7 as a cylindrical surface. In this case, if an excessive load temporarily acts on the magnetic nut 2, the screw shaft 1 and the magnetic nut 2 are axially relatively moved by an amount corresponding to the integral multiple of the pitch of the thread crests 3 and 13 against the magnetic force produced between the screw shaft 1 and the yokes 6.

Therefore, if the magnetic nut 2 abuts against another member or the like during the rotation of the screw shaft 1, the magnetic nut 2 stops moving irrespective of the rotation of the screw shaft 1. Therefore, the function of a torque limiter is obtained which stops the movement of the magnetic nut 2 when the latter is subjected to a predetermined load.

The present invention has so far been described with reference to various embodiments; however, the invention is not limited to these embodiments. For example, the materials, shapes and sizes of the housing 4, magnets 5 and yokes 6 given above are by way of example only and may be changed without departing from the scope and spirit of the present invention.

In the first embodiment, each yoke 6 may be integrally provided with a cylindrical portion which fits in a magnet 5 and the inner peripheral surface of said cylindrical potion may be formed with thread crests 13.

If the thread crests 3 and 13 are those of a square thread with a square cross section, the opposed surfaces of the thread crests 3 and 13 are concentric cylindrical surfaces, making the passage of the magnetic flux easiest particularly between the screw shaft 1 and the yokes 6. However, the cross section of the thread crests 3 and 13 may be trapezoidal or other shape.

While the step-out preventing projection 16 is integrally provided on the guide ring 7, it may be made of synthetic resin or it may be constituted by a metal pin and inserted in a pin-receiving hole or the like formed in the guide ring 7.

Further, the guide ring 7 and the step-out preventing projection 16 may be completely separated from each other and installed at axial different positions.

What is required of the magnets 5 and yokes 6 is that they are annular when installed in the magnetic nut 2. They may be of integral annular construction or they may be circumferentially divided into a plurality of divisional bodies which are then installed in the housing 4 so that they are annular as a whole.

In addition, in FIGS. 5, 6, 7 and 8, the magnet unit disclosed in FIG. 1 is installed in the housing 4; however, this magnet unit may be replaced by the magnet unit disclosed in FIG. 4.

What is claimed is:

1. A magnetic screw comprising a screw shaft of magnetic material having thread crests formed on the outer peripheral surface thereof, and a magnetic nut fitted on the outer periphery of said screw shaft, wherein:

said magnetic nut comprises annular permanent magnets magnetized with magnetic poles of opposite polarities on opposed sides, and annular yokes disposed such that said annular yokes are magnetically coupled with the magnetic poles of said magnets, and the inner peripheral surfaces of said yokes are provided with thread crests corresponding with the thread crests of said screw shaft with a minute gap G defined therebetween such that magnetic circuits are formed between said screw shaft and the magnets through said thread crests of said screw shaft, said magnets are magnetized on their inner and outer radial surfaces with magnetic poles of opposite polarities, and said yokes are fitted in said magnets.

2. A magnetic screw as set forth in claim 1, wherein:

said magnets are axially disposed at predetermined intervals such that the arrangements of radially inner and outer magnetic poles of adjacent magnets are mutually reversed, and each yoke is fitted in each magnet and fixed in the latter.

3. A magnetic screw as set forth in claim 2, wherein:

a spacer is interposed between each said magnet and each said yoke which are fitted together outside and inside, and said magnets, said yokes and said spacers constitute a magnet unit.

4. A magnetic screw as set forth in claim 3, wherein said magnet unit is removably installed in a housing.

5. A magnetic screw as set forth in claim 2 or 3, wherein a housing of magnetic material which also serves as a yoke is installed on the outer peripheral sides of said magnets.

6. A magnetic screw as set forth in claim 4, wherein said housing is made of magnetic or non-magnetic material.

7. A magnetic screw as set forth in claim 3, wherein a housing is internally formed with an axial receiving portion, an internally threaded portion on one end side of said receiving portion, and a partition wall on the other end side of said receiving portion, and said magnet unit is fitted in said receiving portion and fixed to said housing by said partition wall and a keep nut which threadedly engages said internally threaded portion.

* * * * *